United States Patent [19]

Gellert

[11] Patent Number: 4,938,681

[45] Date of Patent: Jul. 3, 1990

[54] INJECTION MOLDING SYSTEM HAVING OFFSET VALVE PIN BIASING MECHANISM

[76] Inventor: Jobst U. Gellert, 7A Prince Street, Georgetown, Ontario, Canada, L7G 2X1

[21] Appl. No.: 362,233

[22] Filed: Jun. 6, 1989

Related U.S. Application Data

[63] Continuation-in-part of Ser. No. 297,495, Jan. 17, 1989, abandoned.

[30] Foreign Application Priority Data

Jan. 3, 1989 [CA] Canada .................................. 587417
Jun. 2, 1989 [CA] Canada .................................. 601625

[51] Int. Cl.$^5$ ............................................. B29C 45/23
[52] U.S. Cl. .................................. 425/549; 264/328.9; 264/328.15; 425/562; 425/563; 425/564; 425/566
[58] Field of Search ................ 425/549, 562, 563, 564, 425/566, 568; 264/328.9, 328.15

[56] References Cited

U.S. PATENT DOCUMENTS

| | | | |
|---|---|---|---|
| 2,940,123 | 6/1960 | Beck et al. | 425/568 |
| 4,286,941 | 9/1981 | Gellert | 425/566 |
| 4,380,422 | 4/1983 | von Holdt | 425/566 |
| 4,380,426 | 4/1983 | Wiles | 425/566 |
| 4,521,179 | 6/1985 | Gellert | 425/566 |
| 4,579,520 | 4/1986 | Gellert | 425/549 |
| 4,787,840 | 11/1988 | Gellert | 425/566 |

OTHER PUBLICATIONS

"Hot-Runner 'Flex Gate' Fills Large Parts Fast with Low Stress", Plastic Technology, Jul. 1988, pp. 21–23.

Primary Examiner—Jay H. Woo
Assistant Examiner—Timothy W. Heitbrink
Attorney, Agent, or Firm—Riches, McKenzie & Herbert

[57] ABSTRACT

A center entry valve gated injection molding system having a heated nozzle secured in front of a heated manifold with at least a pair of valve member biasing mechanisms extending radially outward from a reciprocating elongated valve member. The melt passage splits into two branches which extend through a manifold outwardly around a rear portion of the valve member. The two branches of the melt passage and the two biasing mechanisms are alternatively evenly angularly spaced around the valve member which considerably reduces the space required. The valve member has an enlarged forward end which opens forwardly into the cavity and is closed in a retracted position in which it seats in the matching mouth of a gate in a nose portion of the nozzle. Each biasing mechanism includes a compression spring which engages a lever member to continuously urge the valve member rearwardly. When injection pressure is applied it overcome the force of the springs and moves the valve member forwardly to the open position. When the cavity is filled, the combination of the back pressure of the melt and the force of the springs with a mechanical advantage from the lever members withdraws the valve member to the closed position. In an alternate embodiment, only a single biasing mechanism is utilized.

8 Claims, 4 Drawing Sheets

INJECTION MOLDING SYSTEM HAVING OFFSET VALVE PIN BIASING MECHANISM

This application is a continuation-in-part of application Ser. No. 297,495 filed Jan. 17, 1989, now abandoned.

BACKGROUND OF THE INVENTION

This invention relates generally to injection molding and more particularly to a central entry valve gated system having an offset valve member biasing mechanism.

Spring loaded elongated valve member actuators are well known in the art. An early example is shown in U.S. Pat. No. 2,940,123 to Beck et al. which issued June 14, 1960. With the trend to higher injection pressures and reduced component size, providing sufficient space to locate the spring is a serious problem, particularly with a center entry system where the melt passage extends through the manifold out around the rear portion of the valve member. Center entry systems having a radially offset pivotal actuating mechanism are known as shown in the applicant's U.S. Pat. No. 4,286,941 which issued Sept. 1, 1981. Another way of dealing with this problem is shown in U.S. Pat. No. 4,380,426 to Wiles which issued Apr. 19, 1983 which discloses a center entry system with a pneumatically actuated piston connected to the driven end of the valve member.

It is also known to provide an injection molding nozzle with a nose portion extending forward into the cavity plate to form the gate as shown in the applicant's U.S. Pat. No. 4,579,520 which issued Apr. 1, 1986. A valve member which extends into the cavity and closes in the rearward direction is shown in the applicant's U.S. Pat. No. 4,521,179 which issued June 4, 1985. Valve members which provide flexing gates are described in U.S. Pat. No. 4,380,422 to Von Holdt which issued Apr. 19, 1983 and "Hot-Runner 'Flex Gate' Fills Large Parts Fast with Low Stress", Plastics Technology, July 1988, p 21-23. Thus, the previous actuating mechanisms either have relatively costly piston actuators, are too cumbersome for the space available, or do not provide sufficient force to close a large diameter gate.

SUMMARY OF THE INVENTION

Accordingly, it is an object of the invention to at least partially overcome the problems of the prior art by providing one or more valve member biasing mechanisms which extend radially outward from the valve member.

To this end, in one of its aspects, the invention provides a valve gated center entry hot runner injection molding system having a heated nozzle which is secured to a heated manifold, the heated nozzle being received in a cavity plate, said nozzle having a forward nose portion which extends through an opening in the cavity plate to the cavity, the nozzle having a central bore with a rear portion and a forward portion which extends through the nose portion of the nozzle to form a gate having a forward mouth, an elongated valve member which extends through the central bore in the nozzle and reciprocates longitudinally between a retracted closed position and a forward open position, the valve member having a forward portion, a central portion which extends through the rear portion of the central bore, and a rear portion which extends into a central opening in the manifold and a melt passage to convey pressurized melt from a central inlet in the manifold to the gate which extends through the manifold and nozzle around the rear portion of the valve member to join a space around the forward portion of the valve member in the forward portion of the central bore which leads to the gate, the central portion of the valve member fitting in the rear portion of the central bore to prevent substantial leakage of the pressurized melt around the reciprocating valve member, the improvement wherein the valve member has an enlarged forward end which seats in the mouth of the gate in the retracted closed position, and a biasing mechanism is mounted in the manifold, the biasing mechanism including biasing means mounted in the manifold and lever means extending to receive a force from the biasing means and apply a force to the valve member in the rearward direction.

Further objects and advantages of the invention will appear from the following description, taken together with the accompanying drawings.

DETAILED DESCRIPTION OF THE DRAWINGS

Figure 1:
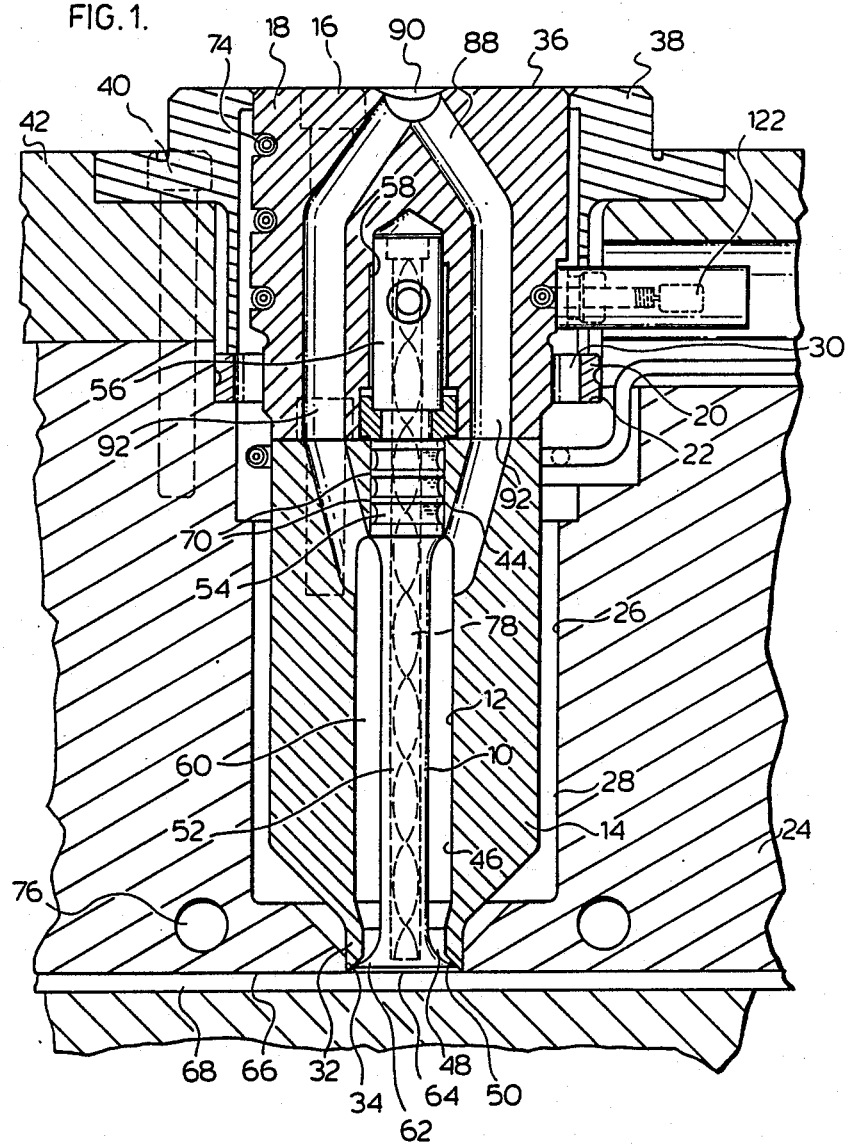
FIG. 1 is a sectional view of a portion of an injection molding system according to one embodiment of the invention showing the configuration of the melt passage.

Reference is first made to FIG. 1 which shows a valve member 10 which is received in a central bore 12 in a nozzle 14 which is secured by bolts 16 to a manifold 18. The manifold 18 has a locating flange 20 which is seated against a circumferential shoulder 22 of a cavity plate 24 to locate the nozzle 14 in a well 26 in the cavity plate 24 with an insulative air space 28 between the heated nozzle 14 and the cooled cavity plate 24. The locating flange 20 has openings 30 through it to reduce heat loss to the surrounding cavity plate 24. The nozzle 14 and manifold 18 are also located laterally by a forward nose portion 32 of the nozzle 14 being received in a matching cylindrical opening 34 through the cavity plate 24 and by the rear end 36 of the manifold 18 being received in a matching opening in a locating collar 38. The locating collar 38 is held securely in place by bolts 40 which extend through the back plate 42 into the cavity plate 24.

The central bore 12 through the nozzle 14 has a rear portion 44 and a larger diameter forward portion 46 which extends through the nose portion 32 of the nozzle to form a gate 48 with a forward mouth 50. The valve member 10 has a forward portion 52, a central portion 54 which extends through the rear portion 44 of the central bore 12, and a rear portion 56 which extends into a central opening 58 in the manifold 18. As can be seen, the forward portion 52 of the valve member 10 is smaller in diameter than the surrounding forward portion 46 of the central nozzle bore 12 which provides a melt flow space 60 between them, except that the forward portion 52 of the valve member has an enlarged forward end 62 which seats in the mouth 50 of the gate 48 in the retracted closed position. The enlarged end 62 of the valve member 10 has a flat forward face 64 which aligns with the same side 66 of the cavity 68 in the closed position. The central portion 54 of the valve member 10 has a number of spaced ridges 70 which fit in the rear portion 44 of the central nozzle bore 12 through the nozzle 14 to prevent leakage of pressurized melt around the reciprocating valve member 10.

Figure 2:
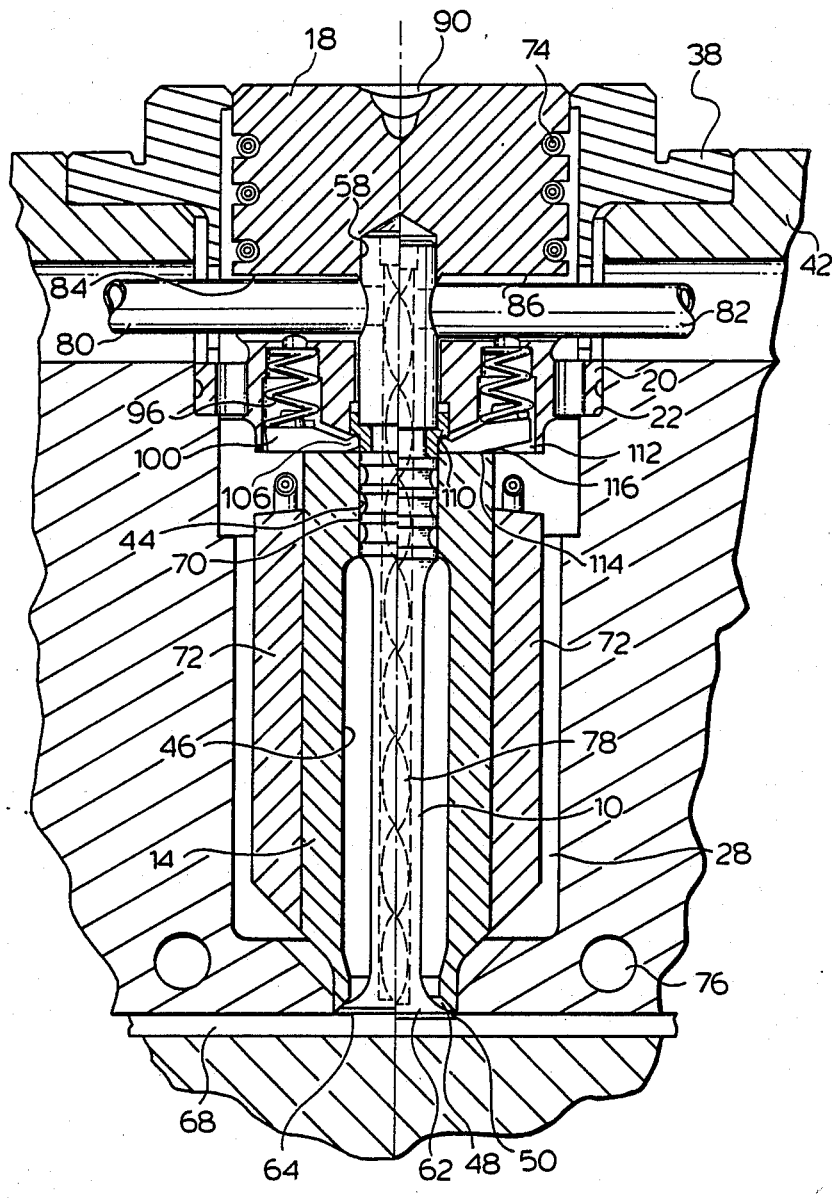
FIG. 2 is a split section view at a right angle to FIG. 1 showing the biasing mechansims in the open and closed positions.

In this embodiment, the nozzle 14 is heated by plate heaters 72 which are secured on opposite sides as seen in FIG. 2. The manifold 18 is heated by an electrical heating element 74 which is integrally cast into it. The cavity plate 24 is cooled by pumping cooling water through cooling conduits 76. In this large volume application with the forward face 64 of the valve member extending to the cavity 68, it is desirable to provide more cooling to the enlarged end 62 of the valve member 10. Thus, a twisted partition 78 is mounted in the hollow valve member 10, and a circulation of cooling water is provided between inlet and outlet pipes 80,82 which extend laterally from the rear portion 56 of the valve member 10 through lateral openings 84,86 in the manifold 18. Thus, cooling water flows into the valve member 10 through the inlet pipe 80, forward along one side of the twisted partition 78 to the enlarged end 62 where it crosses over and flows rearwardly along the other side of the twisted partition and back out through outlet pipe 82.

As seen in FIG. 1, a melt passage 88 extends to convey pressurized melt from a central inlet 90 at the rear end 36 of the manifold 18 to the gate 48. The passage 88 splits into two branches 92 which extend around the opening 58 in the manifold and join the space 60 around the forward portion 52 of the valve member 10. While the forward portion 52 of the valve member 10 is shown in this embodiment as being smaller in diameter than the central portion 54, this is not necessarily the case. The important thing is that the forward portion 46 of the central nozzle bore 12 must be sufficiently larger than the forward portion 52 of the valve member 10 to provide the space 60 with a sufficient cross-sectional area to convey the melt received through the split branches 92 of the melt passage 88. When the injection pressure of the melt forces the valve member 10 to the forward open position, the melt then flows through the gate 48 outwardly around the enlarged head 62 of the valve member 10 into the cavity 68.

Figure 3:
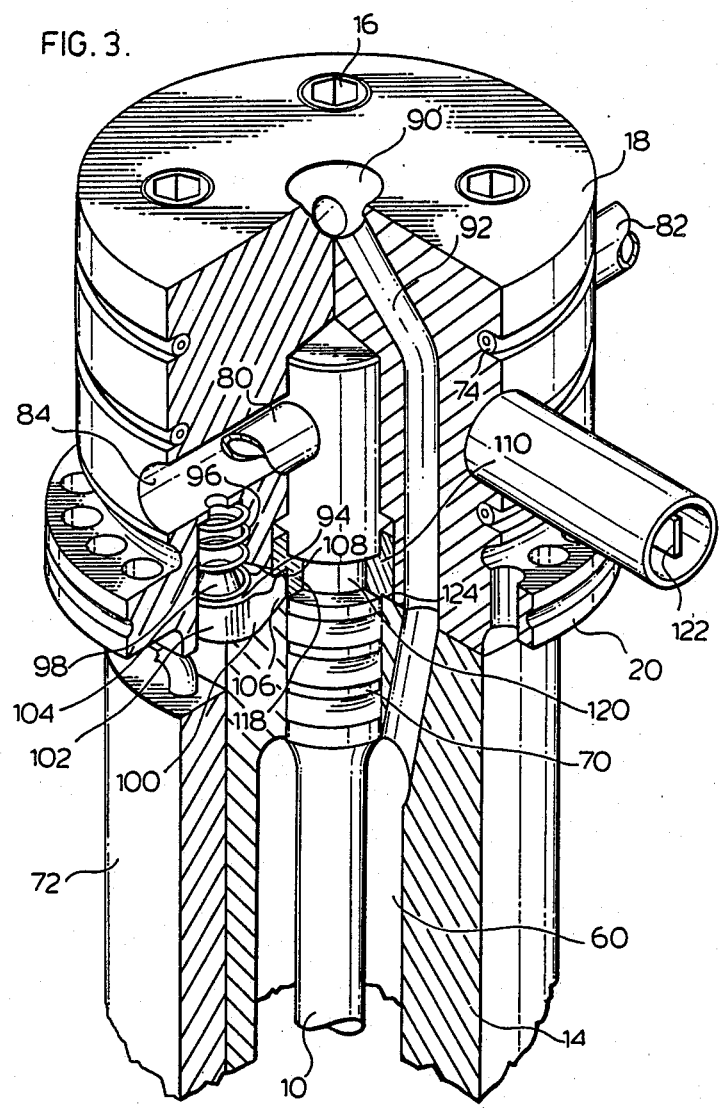
FIG. 3 is a cut-away isometric view showing the relationship of the melt passage and the biasing mechanisms in more detail.

Reference will now be made to FIG. 3 in describing the two valve member biasing mechanisms 94 which are located on opposite sides of the central opening 58 in the manifold which receives the rear portion 56 of the valve member 10 In this embodiment of the invention the two biasing mechanisms 94 and the two branches 92 of the melt passage 88 are equally angularly spaced in an alternating arrangement around the valve member 10. This balances the lateral forces on the valve member and the branches 92 of the melt passage 88 extend between the biasing mechanisms 94 so as to not unduely increase the necessary diameter of manifold 18 and the nozzle 14.

Each biasing mechanism 94 includes a coiled compression spring 96 which is seated in a cylindrical opening 98 in the manifold 18 and a lever member 100 which extends radially inward from the spring 96. As can be seen, the lever member 100 has an outer end 102 with a locating tit 104 which receives the spring 96 and an inner end 106 which extends into a notch 108 in a split ring 110 which extends around the rear portion 56 of the valve member 10. The lever member 100 extends radially in a slot 112 in the manifold and is shaped to provide a fulcrum 114 near the inner end 106 which abuts against the rear end 116 of the nozzle 14. The split ring 110 has an inner portion 118 which is seated in a channel 120 which extends around the rear portion 56 of the valve member 10. Thus, when the spring 96 forces the outer end 102 of the lever member 100 forward, the lever member 100 pivots around the fulcrum 114 and retracts the split ring 110 and the valve member 10 to which it is engaged. The position of the fulcrum 114 provides a mechanical advantage to the force transmitted from the spring 96 to the valve member 10. Consequently, the travel of the valve member 10 is considerably less than that of the outer end of the lever member 100 which receives the spring. Of course, the springs 96 and lever member 100 on opposite sides of the split ring 110 are of equal sizes so as to apply balanced forces to the valve member.

In use, the system is assembled as shown and electrical power is applied to the plate heaters 72 and the terminal 122 of the heating element 74 to heat the nozzle and manifold 18 to a predetermined operating temperature. Pressurized melt from a molding machine (not shown) is introduced into the melt passage 88 through the central inlet 90 according to a predetermined cycle. When injection pressure is applied, the force of the melt on the enlarged end 62 of the valve member overcomes the spring force and drives the valve member 10 forward until the forwardly facing shoulder 124 of the split ring 110 stops against the rear end 116 of the nozzle 14 in the open position. The melt then flows through the melt passage 88 and the gate 48 until the cavity 68 is filled. When the cavity 68 is filled, the combination of the back pressure of the melt in the cavity 68 and the force of the springs 96 drives the valve member 10 to the retracted closed position in which the enlarged forward end 62 is seated in the matching mouth 50 of the gate 48. The injection pressure is then released and after a short cooling period, the mold is opened to eject the molded products After ejection, the mold is closed, injection pressure is reapplied which reopens the gate 48. This cycle is repeated continuously with a frequency dependent upon the size of the cavity and the type of material being molded. As can be seen, the travel of the valve member 10 is relatively short, but large cavities can be filled quickly because of the large diameter of the enlarged end 62 of the valve member and the mouth 50 of the gate 48. The shape of the enlarged end 62 and the mouth causes the pressurized melt to flare outwardly as it enters the cavity 68. This produces a radial molecular orientation of the melt which is advantageous in increasing the strength of products having certain configurations.

Figure 4:
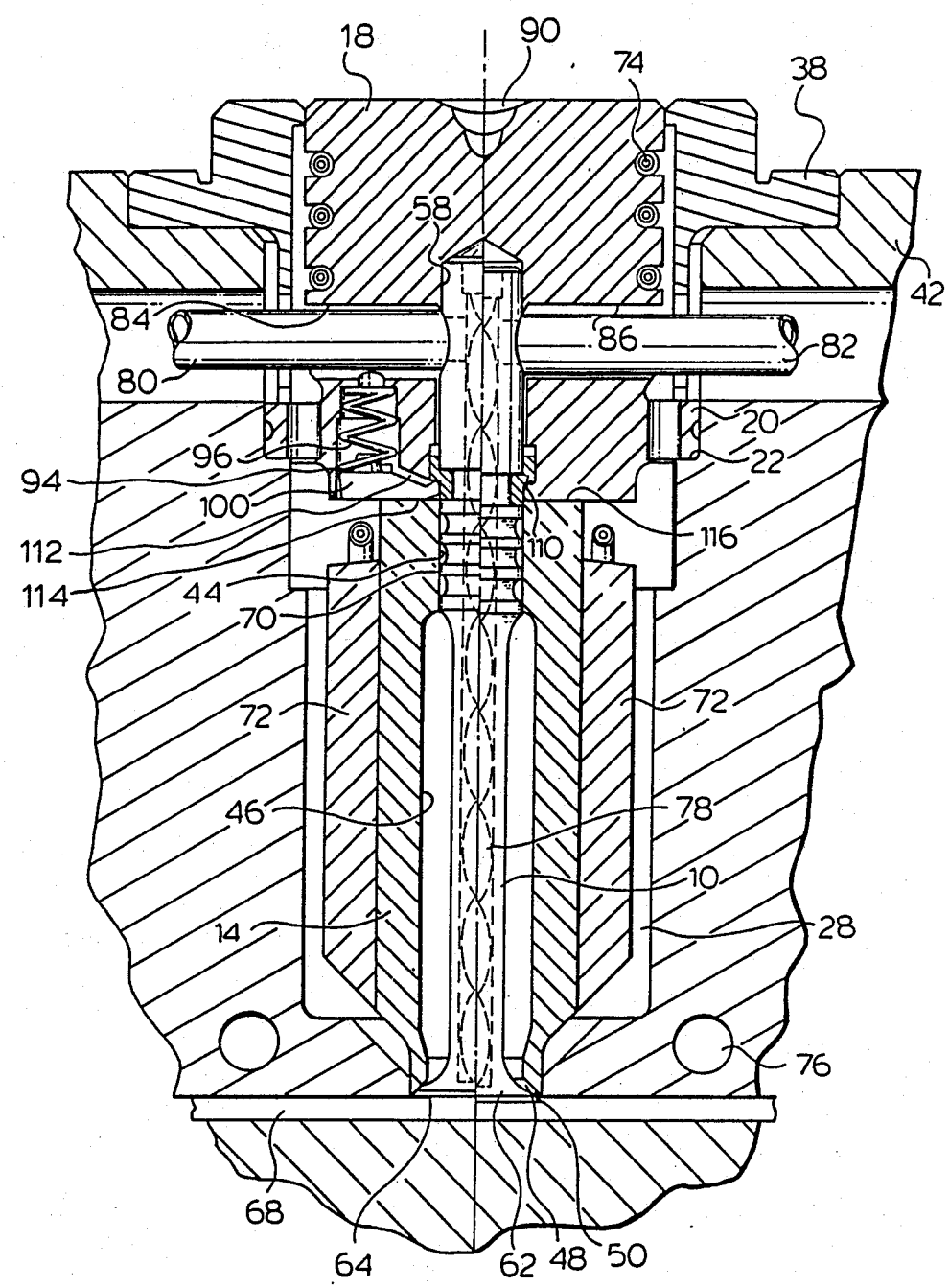
FIG. 4 is a similar split section view showing another embodiment of the invention.

FIG. 4 shows an alternate embodiment of the invention having only a single biasing mechanism 94. It has been found that during normal continuous operation, when the cavity 68 fills up with pressurized melt, the back pressure of the melt in the cavity against the forward face 64 of the valve member 10 is sufficient to drive the valve member 10 to the retracted closed position without the additional force of the biasing mechanism 94. However, the biasing mechanism 94 is necessary to avoid the valve member 10 being frozen in the open position when the system is shut down. This would cause considerable difficulty in getting the system operational again. Otherwise, this embodiment is the same as the embodiment described above and the description need not be repeated.

While the description of the injection molding system with offset valve member biasing mechanisms has been given with respect to a preferred embodiment, it is not to be construed in a limiting sense. Variations and modifications will occur to those skilled in the art. For instance, it is apparent that the shape of the springs 96 and lever members 100 can be changed Also the shape of the valve member 10, the central bore 12 and the opening 58 in the manifold 18 in which it is received can be varied. Reference is made to the appended claims for a definition of the invention.

What I claim is:

1. In a valve gated center entry hot runner injection molding apparatus having a heated nozzle which is secured to a heated manifold, the heated nozzle being received in a cavity plate, said nozzle having a central bore and a forward nose portion which extends through an opening in the cavity plate to a cavity, the central bore of the nozzle having a rear portion and a forward portion which extends through the nose portion of the nozzle to form a gate forming a forward mouth, an elongated valve member which extends through the central bore in the nozzle and reciprocates longitudinally between a retracted closed position and a forward open position, the valve member having a forward portion, a central portion, and a rear portion, the central portion of the valve member extending through the rear portion of the central bore, the rear portion of the valve member extending into a central opening the manifold, and a melt passage to convey pressurized melt from a central inlet in the manifold to the gate, the melt passage extending through the manifold and nozzle around the rear portion of the valve member to join a space which leaks to the gate, the space extending around the forward portion of the valve member in the forward portion of the central bore, the central portion of the valve member fitting in the rear portion of the central bore to prevent substantial leakage of the pressurized melt around the reciprocating valve member, the improvement wherein:

the valve member has an enlarged forward end which seats in the mouth of the gate in the retracted closed position, and (a) at least one biasing mechanism is mounted in the manifold, the at least one biasing mechanism including a compression spring mounted in the manifold and lever means extending to receive a force from the compression spring and apply a force to the valve member in a rearward direction.

2. An injection molding apparatus as claimed in claim 1 wherein the lever means engages a split ring which is received beween the rear portion of the valve member and the manifold, the split ring engaging the rear portion of the valve member to urge the valve member to the rearward closed position.

3. An injection molding apparatus as claimed in claim 1 wherein the forward end of the valve member has a forward face which is in alignment with and forms a portion of a side of the cavity when the valve member is in the retracted closed position.

4. An injection molding apparatus as claimed in claim 3 wherein cooling water is circulated longitudinally through the valve member.

5. An injection molding apparatus as claimed in claim 4 wherein the water flows forwardly and rearwardly on opposite sides of a partition.

6. An injection molding apparatus as claimed in claim 5 wherein the partition is twisted.

7. An injection molding apparatus as claimed in claim 1 wherein a plurality of biasing mechanisms are mounted in the manifold to extend radially outward from the rear spring 96 and a lever member 100. However, as stated at lines 6 and 7 on page 9 of the specification the lever member 100 "extends radially in a slot 112 in the manifold". Therefore, it is submitted that it is mounted in the manifold.

8. An injection molding apparatus as claimed in claim 7 wherein there are two valve member biasing mechanisms and the melt passage splits into two branches which extend around the rear portion of the valve member, the two valve member biasing mechanisms and the two branches of the melt passage being located to alternate angularly around the valve member.

* * * * *